(12) United States Patent
Abehasera

(10) Patent No.: US 10,912,419 B2
(45) Date of Patent: Feb. 9, 2021

(54) MANUAL GRINDER

(71) Applicant: TRI Innovations LLC, Hallandale Beach, FL (US)

(72) Inventor: Benyamin Abehasera, Hallandale Beach, FL (US)

(73) Assignee: TRI Innovations LLC, Hallandale Beach, FL (US)

( * ) Notice: Subject to any disclaimer, the term of this patent is extended or adjusted under 35 U.S.C. 154(b) by 177 days.

(21) Appl. No.: 16/285,582

(22) Filed: Feb. 26, 2019

(65) Prior Publication Data

US 2020/0268207 A1   Aug. 27, 2020

(51) Int. Cl.

| | | |
|---|---|---|
| A47J 42/46 | (2006.01) | |
| A47J 42/24 | (2006.01) | |
| A47J 42/26 | (2006.01) | |
| A47J 42/30 | (2006.01) | |
| A47J 42/28 | (2006.01) | |
| A24B 7/00 | (2006.01) | |
| A47J 43/25 | (2006.01) | |
| A47J 42/14 | (2006.01) | |
| B02C 18/10 | (2006.01) | |
| B02C 23/16 | (2006.01) | |
| B02C 18/08 | (2006.01) | |
| B02C 18/18 | (2006.01) | |

(52) U.S. Cl.
CPC ............... *A47J 42/46* (2013.01); *A24B 7/00* (2013.01); *A47J 42/14* (2013.01); *A47J 42/24* (2013.01); *A47J 42/26* (2013.01); *A47J 42/28* (2013.01); *A47J 42/30* (2013.01); *A47J 43/25* (2013.01); *B02C 18/10* (2013.01); *B02C 18/08* (2013.01); *B02C 18/186* (2013.01); *B02C 23/16* (2013.01); *B02C 2023/165* (2013.01)

(58) Field of Classification Search
CPC .. A47J 42/46; A47J 42/26; A47J 42/30; A47J 42/28; A47J 42/14; A47J 43/25; A24B 7/00
USPC ...................................... 241/169.1
See application file for complete search history.

(56) References Cited

U.S. PATENT DOCUMENTS

| | | | | |
|---|---|---|---|---|
| 4,844,352 A | * | 7/1989 | Griffin | ............. A47J 42/04 241/101.2 |
| 7,422,170 B2 | * | 9/2008 | Bao | ............. B02C 18/24 241/168 |

(Continued)

*Primary Examiner* — Faye Francis
(74) *Attorney, Agent, or Firm* — Geoffrey Lottenberg; Berger Singerman LLP

(57) ABSTRACT

A portable manual grinder has a driving section, a grinding section and a discharging section coaxially connected from top to bottom. The driving section has a drive shaft that drives a central axis of the grinding section. The drive shaft is connected to a gear set that increases the gear ratio to facilitate manual grinding. The grinding section comprises an upper grinding section and a lower grinding section that are coaxially disposed and mated together. The upper and lower grinding portions include corresponding blades extending therefrom. The bottom section of the lower grinding section has one or more holes in communication with the discharge section. The driving section and the upper grinding section are magnetically attracted and connected to each other and the upper grinding section and the lower grinding section are magnetically attracted and connected to each other.

14 Claims, 12 Drawing Sheets

(56) References Cited

U.S. PATENT DOCUMENTS

| | | | | |
|---|---|---|---|---|
| 8,393,563 B2* | 3/2013 | Chaoui | .................. | B02C 18/24 |
| | | | | 241/168 |
| 8,733,679 B2* | 5/2014 | Camitta | .................. | B02C 18/16 |
| | | | | 241/30 |
| 9,505,009 B1* | 11/2016 | Wein | .................... | B02C 18/186 |
| 9,681,777 B1* | 6/2017 | Dukat | .................... | B02C 18/18 |
| 9,737,092 B2* | 8/2017 | Grumbacher | ............ | A24C 5/40 |
| 10,039,418 B2* | 8/2018 | Staiano | .................. | A47J 42/00 |
| 10,455,984 B1* | 10/2019 | Abehasera | .............. | A47J 42/48 |
| 2004/0159727 A1* | 8/2004 | Mueller | .............. | A47J 43/1068 |
| | | | | 241/169.1 |
| 2011/0180643 A1* | 7/2011 | Wong | .................. | A47J 43/1025 |
| | | | | 241/169.1 |
| 2014/0353412 A1* | 12/2014 | Grumbacher | ............ | A24C 5/40 |
| | | | | 241/70 |
| 2016/0106262 A1* | 4/2016 | Mroue | .................... | A47J 42/30 |
| | | | | 241/79 |
| 2016/0143480 A1* | 5/2016 | Watts | .................... | A47J 42/38 |
| | | | | 241/69 |
| 2017/0202396 A1* | 7/2017 | Gumbel | .................. | A47J 42/12 |
| 2017/0245541 A1* | 8/2017 | Pagan | .................... | A47J 42/34 |
| 2017/0251878 A1* | 9/2017 | Dukat | .................... | B02C 23/10 |
| 2017/0319009 A1* | 11/2017 | Seckel | ................ | B02C 18/2216 |
| 2018/0126386 A1* | 5/2018 | Witko | .................... | B02C 18/16 |
| 2020/0187716 A1* | 6/2020 | Ashton | .................. | A47J 42/14 |

* cited by examiner

MANUAL GRINDER

CROSS REFERENCE TO RELATED APPLICATIONS

N/A

FIELD OF THE INVENTION

The present invention relates to the technical field of grinders, more particularly to a portable manual grinder.

BACKGROUND OF THE INVENTION

In daily life, people gradually begin to have personalized demands for smoking a small amount of tobacco or refined tobacco, hemp plants, hemp flowers, spices and herbs. Most of these products have to be pulverized or ground in order to effectively smoke. Many users desire the convenience of a small manual grinder which is easy to carry and capable of grinding herbs at a high speed.

Traditional manual hand grinders typically comprise an upper grinding plate and a lower grinding plate, each of which is provided with a blade. However, without an acceleration structure, the upper and lower grinding plates of the system primarily relies on manual force for grinding. The grinding speed is slow, and the herbs often cannot be crushed quickly and effectively. After the pulverization is completed, the cap component on the bottom of the system has to be manually opened to retrieve the ground material, which must be done by shaking the plates or manually picking the content out—discharging the material cannot be accomplished automatically. Accordingly, there is a need in the art for a portable manual grinder, which is compact and easy to carry and has a driving component with an accelerating transmission mechanism, and an active discharging mechanism.

DETAILED DESCRIPTION

Figure 1:
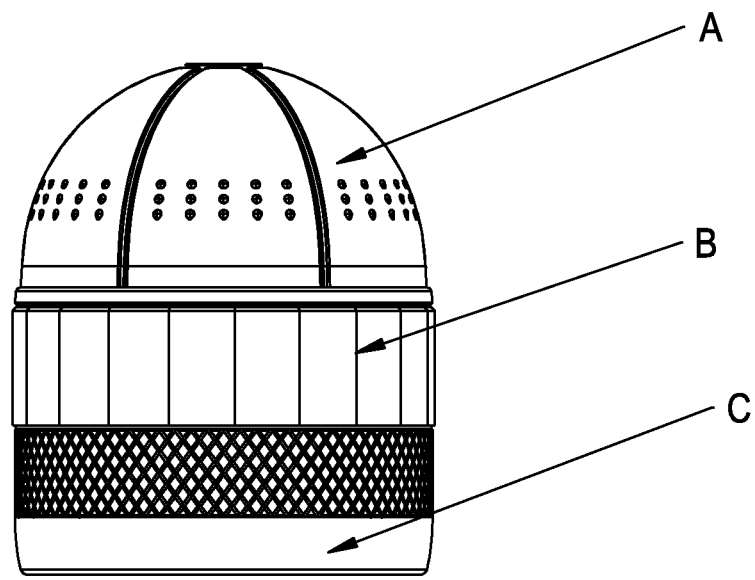
FIG. 1 is a front view of a portable manual grinder.
Figure 2:
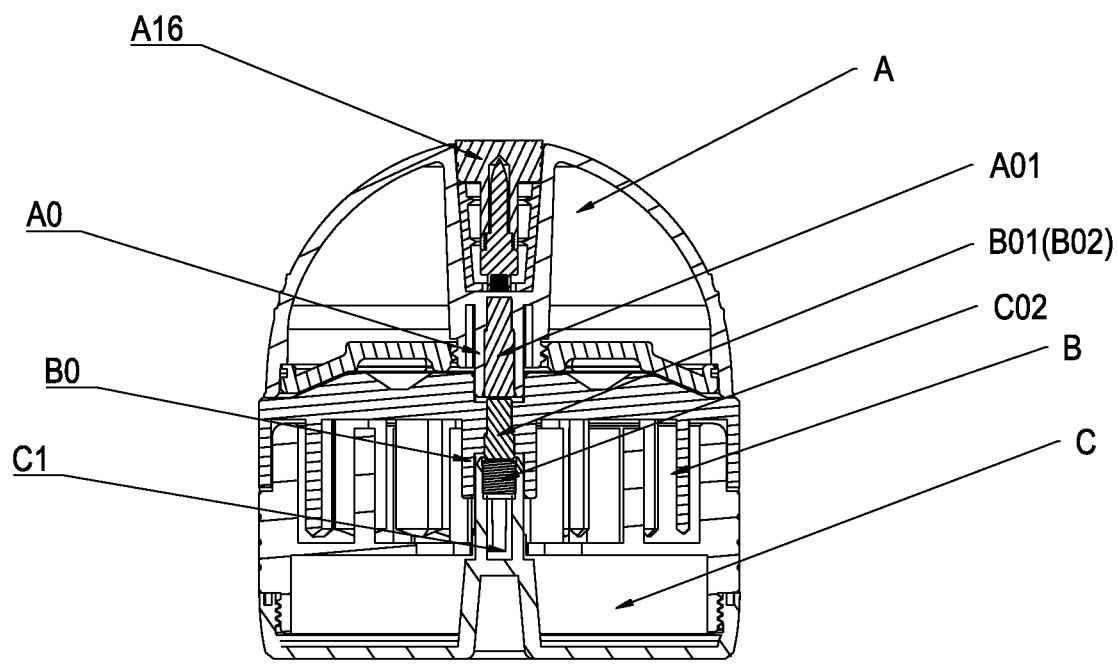
FIG. 2 is a cross-sectional view of a portable manual grinder.
Figure 3:
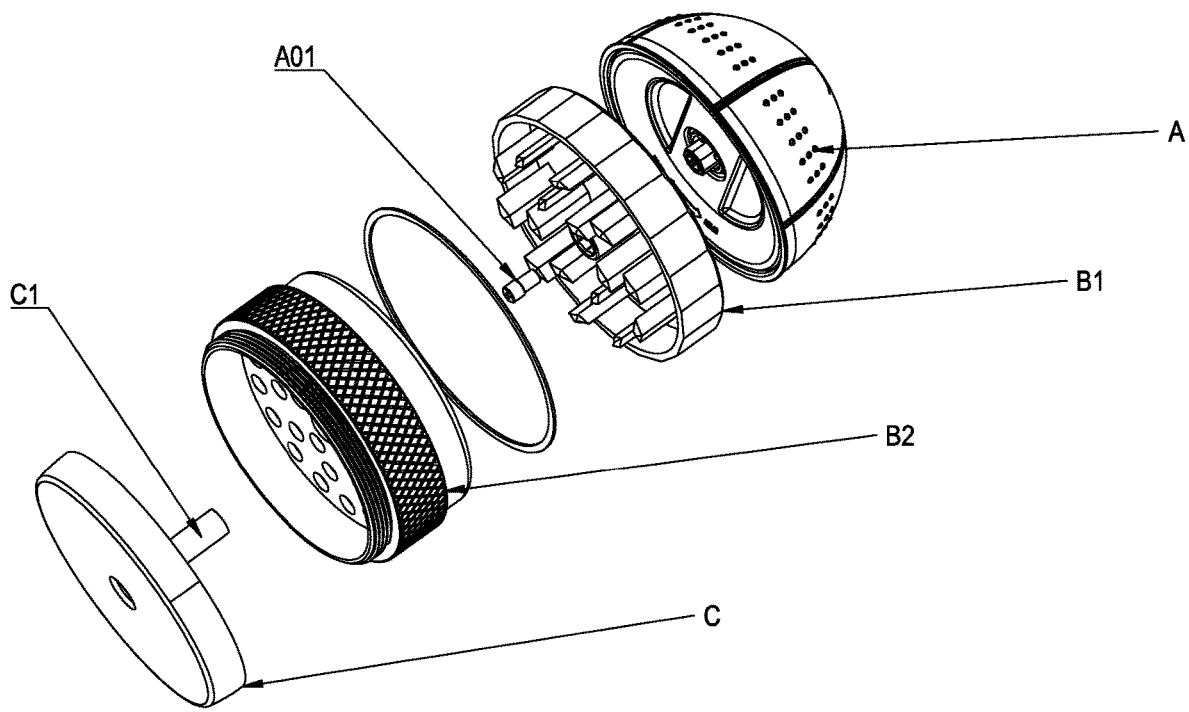
FIG. 3 is an exploded view of a portable manual grinder.
Figure 4:
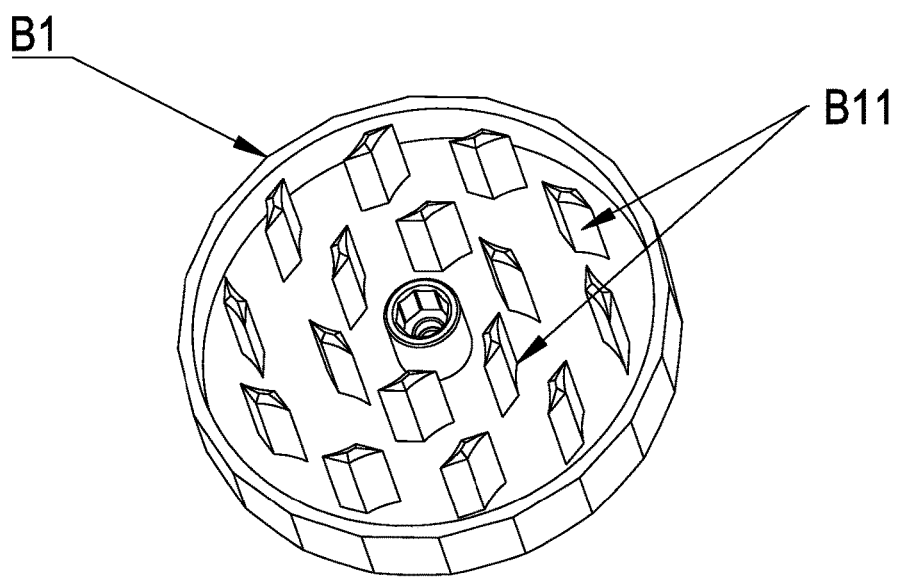
FIG. 4 is a perspective view illustrating the upper grinding section according.
Figure 5:
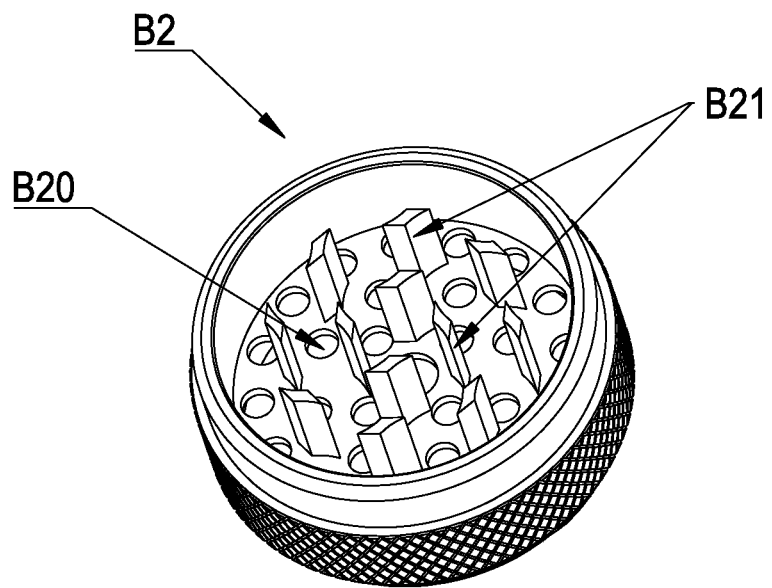
FIG. 5 is a perspective view illustrating the lower grinding section.

In the following description, for the purposes of explanation, numerous specific details are set forth in order to provide a thorough understanding of the present invention. It will be apparent, however, to one skilled in the art that the present invention may be practiced without some of these specific details. Throughout this description, the embodiments and examples shown should be considered as exemplars, rather than as limitations on the invention. That is, the following description provides examples, and the accompanying drawings show various examples for the purposes of illustration. However, these examples should not be construed in a limiting sense as they are merely intended to provide examples of the invention rather than to provide an exhaustive list of all possible implementations thereof.

Specific embodiments of the invention will now be further described by the following, non-limiting examples which will serve to illustrate various features. The examples are intended merely to facilitate an understanding of ways in which the invention may be practiced and to further enable those of skill in the art to practice the invention. Accordingly, the examples should not be construed as limiting the scope of the invention. In addition, reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Referring to FIGS. 1-6, in some embodiments the a portable manual grinder includes a driving section A, a grinding section B and a discharging section C each coaxially connected to one another from top to bottom. The driving section A comprises a drive shaft A0 which drives a central axis B0 of the grinding section B. The grinding section B comprises an upper grinding section B1 and a lower grinding section B2 that are coaxially disposed and mated together. The upper grinding section B1 and the lower grinding section B2 respectively include an upper blade group B11 and a lower blade group B21 composed of a plurality of upright blades. The blades of the upper blade group B11 and the lower blade group B21 are respectively arranged in a circular shape such that the blades of the upper blade group B11 are inserted and received between the blades of the lower blade group B21 when the two blade groups are mated together. In some embodiments, when mated as such, the blades from upper blade group B11 and the lower blade group B21 are relatively close to each other such that when the grinder is rotated the target material is effectively cut and ground by the blades. The bottom section of the lower grinding section B2 is provided with holes B20 which are in flow communication with the discharge section C below it. The driving section A and the upper grinding section B1 are magnetically attracted and removably connected to each other through a first magnetic material A01 and B01 respectively disposed on each of them at a corresponding position. The upper grinding section B1 and the discharge section C are both provided with a second magnetic material B02 and C02, respectively such that the upper grinding section B1 and the lower grinding section B2 are magnetically attracted and connected to each other. In some embodiments the magnetic material A01, B01, B02, and C02 are together axially aligned along the central axis of the grinder.

Figure 6:
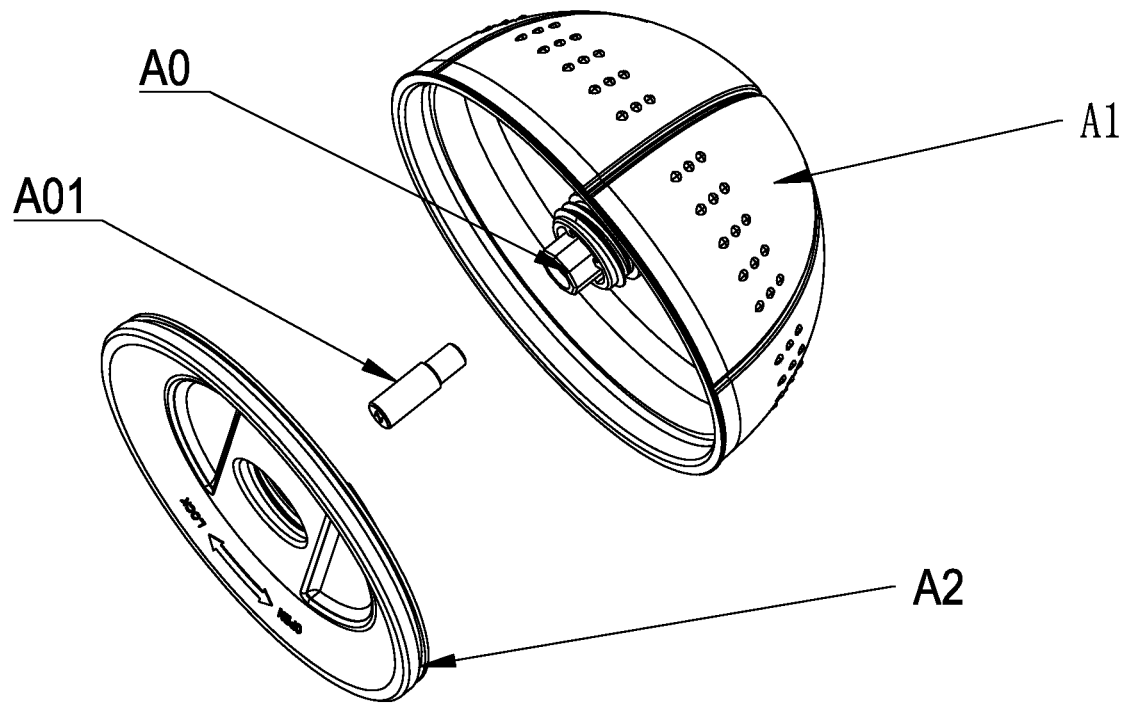
FIG. 6 is a perspective view illustrating a driving section.

Referring to FIG. 6, the driving section A further comprises an outer cover A1 and a bottom cap A2 connected to the bottom of the outer cover A1. A drive shaft A0 is disposed at a center of the interior of the outer cover A1 and protrudes from the bottom cap A2 such that rotating the outer cover A1 drives the drive shaft.

Referring back to FIGS. 2-3, an outer wall of the discharge section C is connected to an outer wall of the lower grinding section B2. A column C1 extends along the central axis of the interior of discharge section C which column C1 passes through a third axis hole B230 formed on the lower grinding section B2. A second magnetic material C02 is embedded on a top end of the column C1.

In use, the user places material to be ground between the blade group B11 and blade group B21 of the grinding portions B1 and B2 and then closes the grinder. The magnetic connections assist in aligning and keeping the grinder closed during operation. The user then applies manual force to the driving section A, which rotates drive shaft A1 and thusly the upper grinding section B1. The material is cut and ground by the interaction of the blade groups B11 and B21 and ground material falls through the holes B20 of the lower grinding section B2 into the discharging section C. The discharging section C can then be removed from the grinding section B such that the user can collect the ground material therein.

Figure 7:
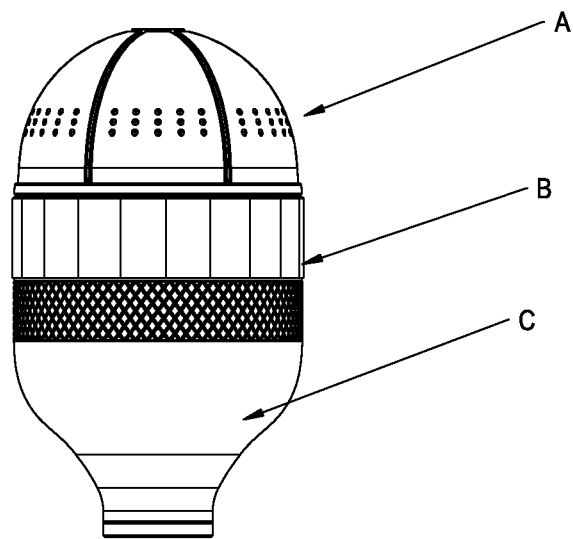
FIG. 7 is a front view of another embodiment of a portable manual grinder.
Figure 8:
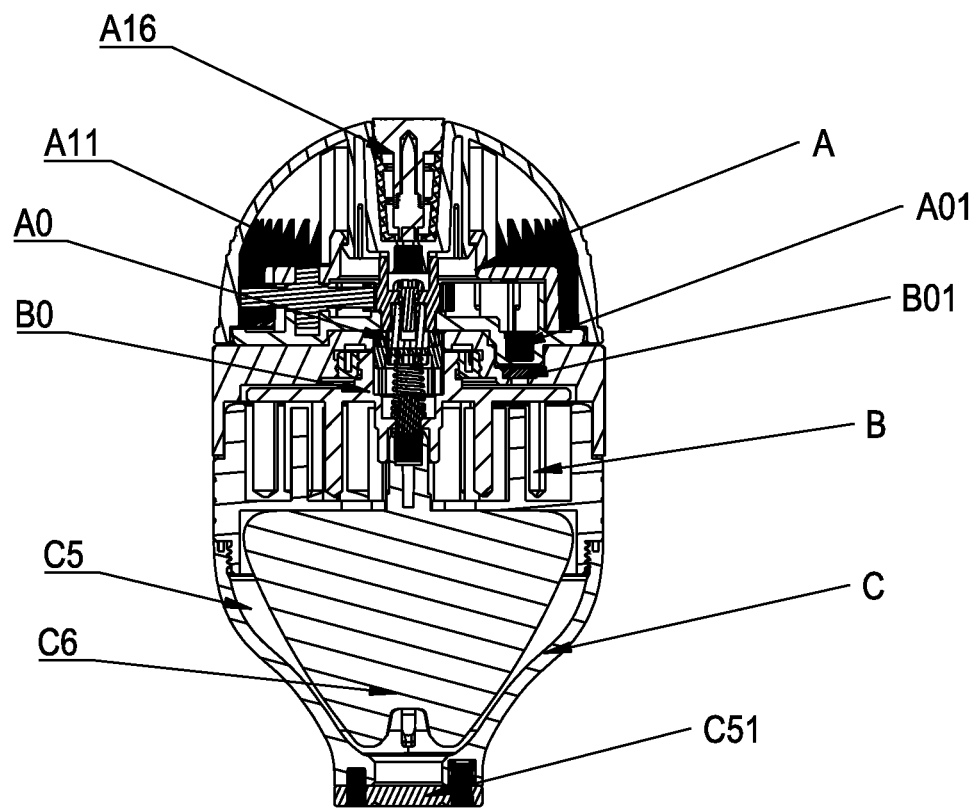
FIG. 8 is a cross-sectional view of a portable manual grinder.
Figure 9:
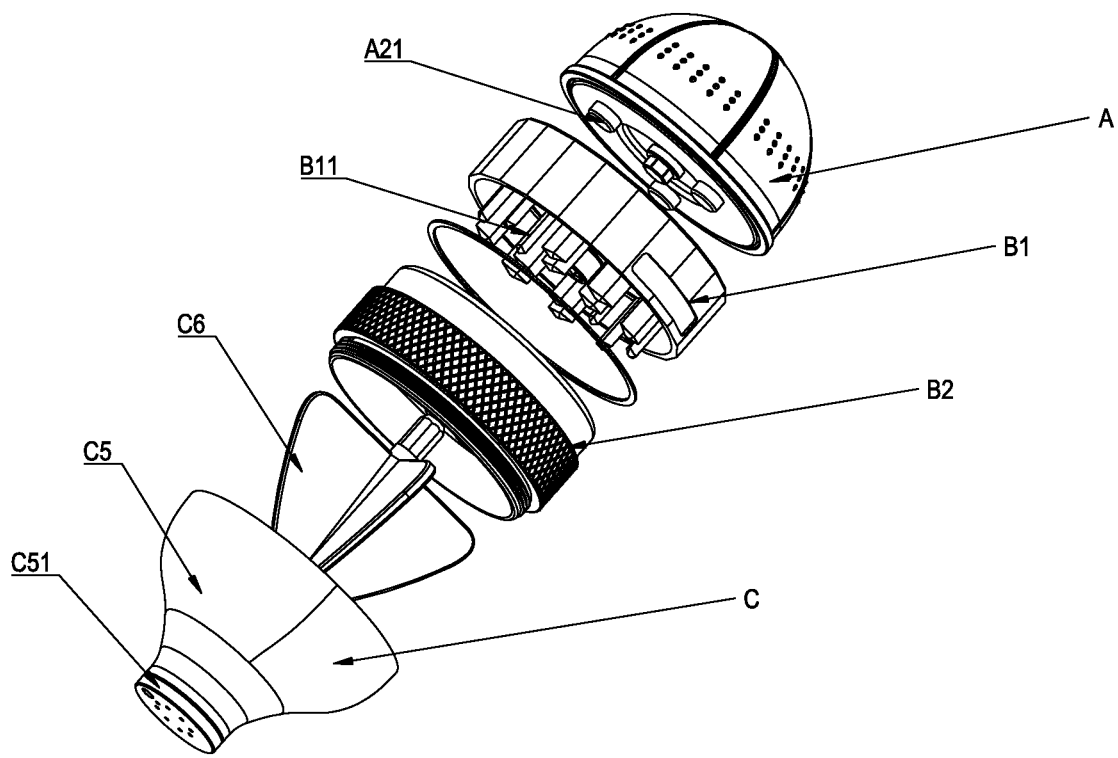
FIG. 9 is an exploded view of a portable manual.

FIGS. 7-24 depict another embodiment of the present invention. Referring to FIGS. 7-9, a portable manual grinder comprises a driving section A, a grinding section B and a discharging section C coaxially connected. The driving section A comprises a drive shaft A0 which drives a central axis B0 of the grinding section B. The grinding section B comprises an upper grinding section B1 and a lower grinding section B2 that are coaxially disposed and attached together. The upper grinding section B1 and the lower grinding section B2 respectively include an upper blade group B11 and a lower blade group B21 composed of a plurality of upright blades. The blades of the upper blade group B11 and the lower blade group B21 are respectively arranged in a circular shape such that the blades of the upper blade group B11 are inserted and received between the blades of the lower blade group B21 when the two blade groups are mated together. In some embodiments, when mated as such, the blades from upper blade group B11 and the lower blade group B21 are relatively close to each other such that when the grinder is rotated the target material is effectively cut and ground by the blades. The bottom section of the lower grinding section B2 includes holes B20 communicating with the discharge section C. The driving section A and the upper grinding section B1 are magnetically attracted and removably connected to each other through a first magnetic material A01 and B01 respectively disposed on each of them at a corresponding position. The upper grinding section B1 and the discharge section C are both provided with a second magnetic material B02 and C02, respectively such that the upper grinding section B1 and the lower grinding section B2 are magnetically attracted and connected to each other. In some embodiments the magnetic material A01, B01, B02, and C02 are together axially aligned along the central axis of the grinder. The magnetic connection permits easy assembly, disassembly, and cleaning of the grinder.

Figure 10:
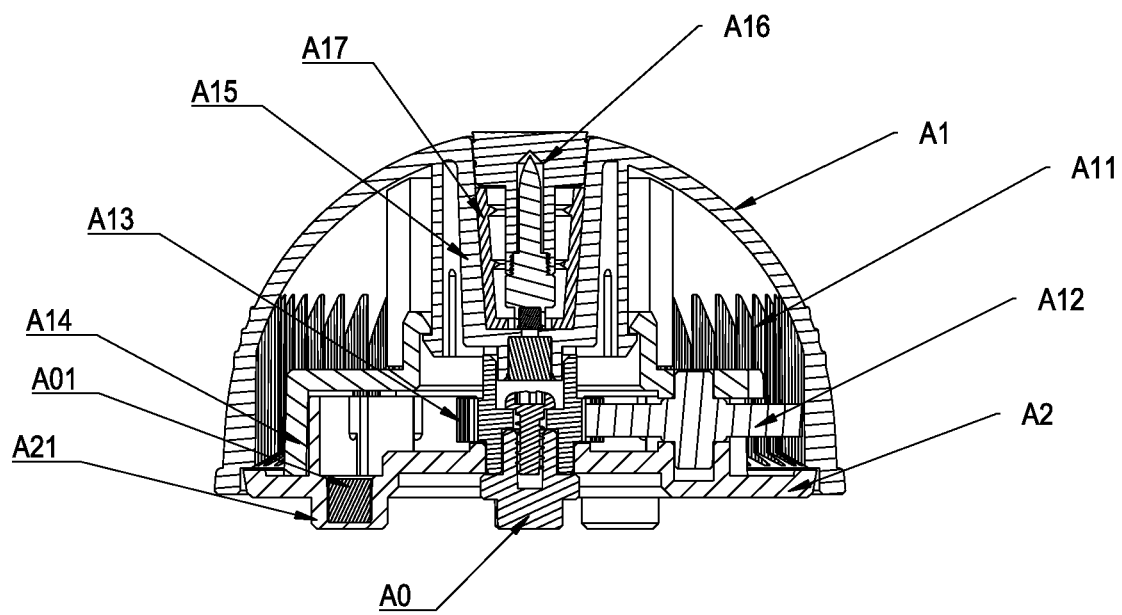
FIG. 10 is a cross-sectional view illustrating a driving section.
Figure 11:
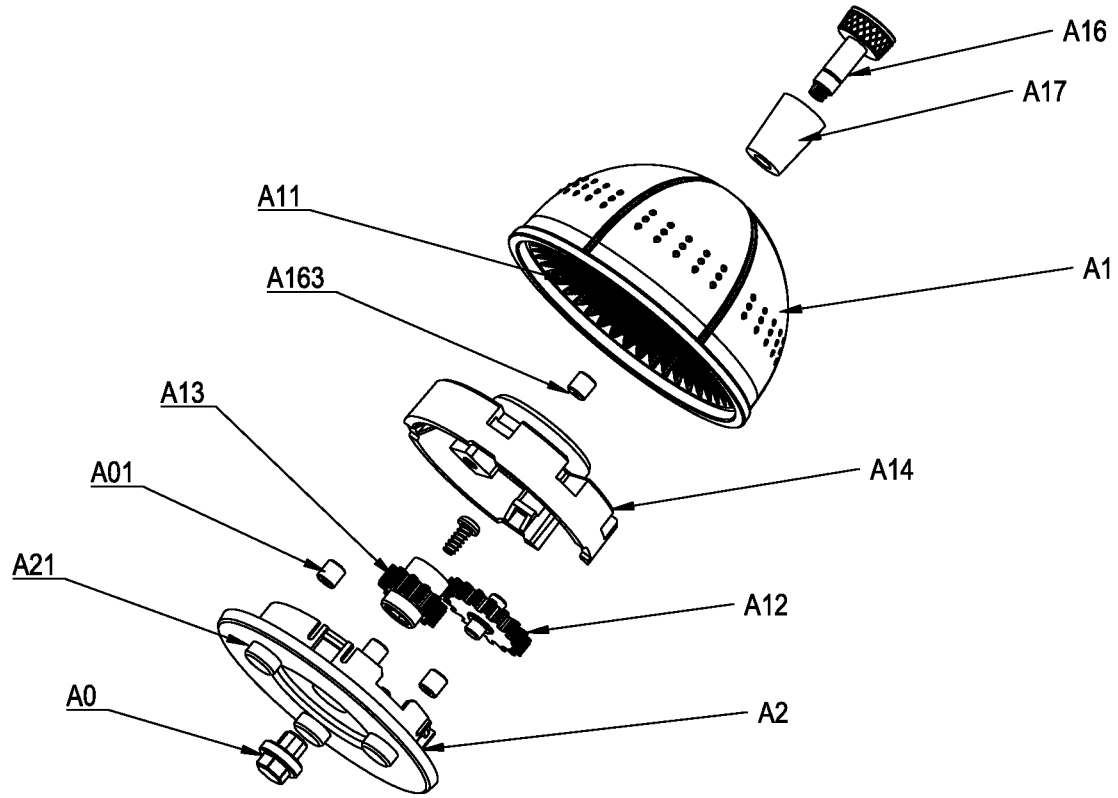
FIG. 11 is a perspective view illustrating a driving section.

Referring to FIGS. 10 and 11, the driving part A further comprises an outer cover A1 and a bottom cap A2 connected to the bottom of the outer cover A1. The drive shaft A0 is disposed at the center of the interior of the outer cover A1 and protrudes from the bottom cap A2. Rotating the outer cover A1 causes drive shaft A0 to rotate. The outer cover A1 is provided with an annular inner wall, where an internal gear A11 is disposed. A driven gear A13 is coaxially provided on the drive shaft A0. An intermediate gear A12, which is engaged with internal gear A11 and the driven gear A13 simultaneously, is arranged therebetween. The internal gear A11 is a driving gear that transmits power to the driven gear A13 upon application of manual rotating force and accelerates the drive shaft A0 by increasing the gear ratio. Driven by human force, the outer cover A1 can be rotated forwardly and reversely.

The upper plane of the upper grinding section B1 is in contact with the lower plane of the bottom cap A2. A downward-facing hollow protruding step A21 is formed on the lower plane of the bottom cap A2, and a groove B17 configured to hold the hollow protruding step A21 is formed on the upper grinding section at a position corresponding to the hollow protruding step. A gear bracket A14 is disposed in the outer cover A1, and the shaft of the driven gear A13 and the shaft of the intermediate gear A12 are both disposed on and retained by the gear bracket A14.

A cone-shaped groove A15 is disposed downwardly at the center of the upper end of the outer cover A1. A stirring needle set A16 is installed within the cone-shaped groove A15 and a silicone sleeve A17 is disposed between the cone-shaped groove A15 and the stirring needle set A16. The silicone sleeve helps to fasten the stirring needle set. The cone-shaped groove A15 fully utilizes the spare space of the outer cover and is configured to accommodate the stirring needle. The stirring needle A163 is used for cleaning purpose in the case that the sieve hole is clogged or the blades become impacted with target material.

Figure 12:
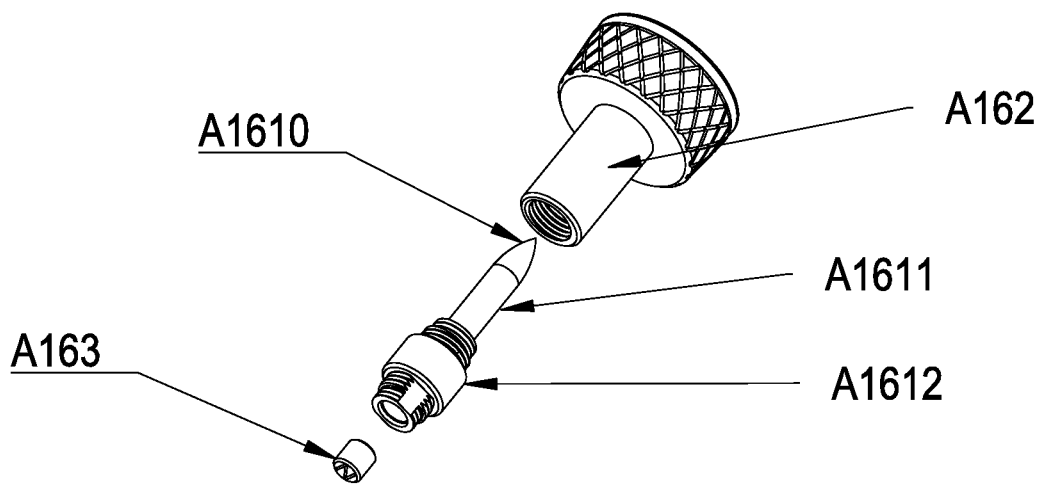
FIG. 12 is a perspective view of illustrating a stirring needle set.
Figure 13:
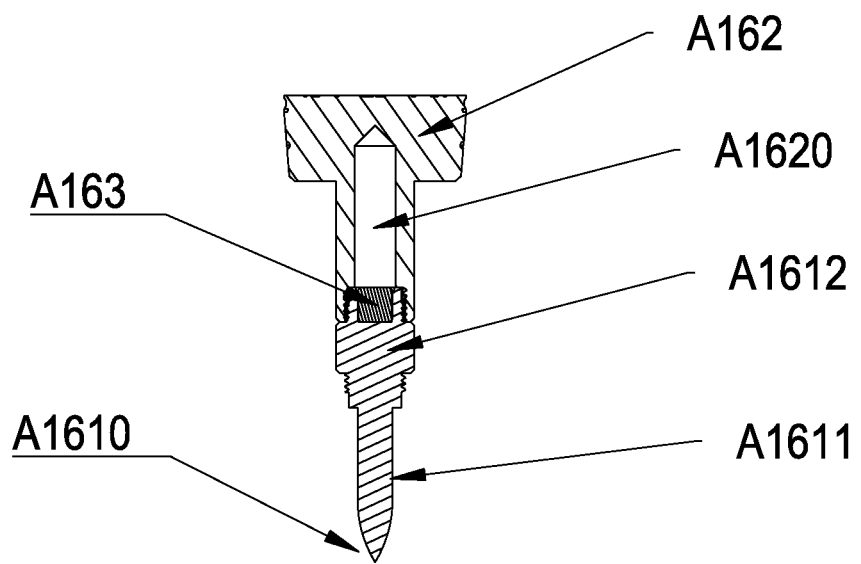
FIG. 13 is a cross-sectional view illustrating a stirring needle set.
Figure 14:
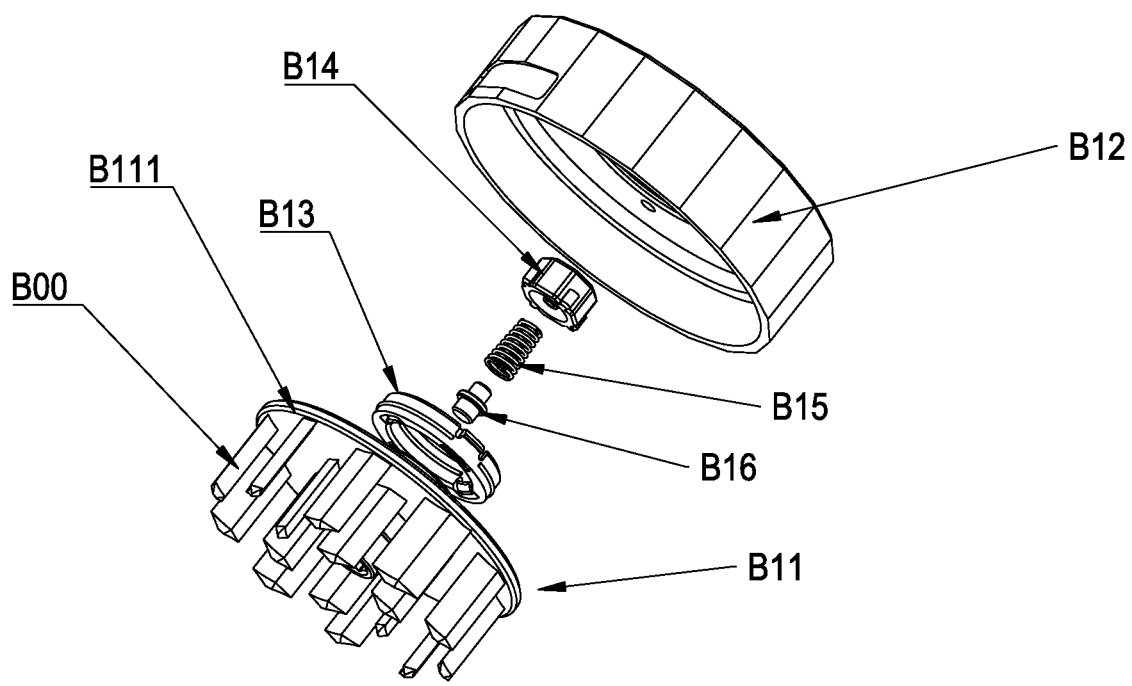
FIG. 14 is an exploded view illustrating an upper grinding section.
Figure 15:
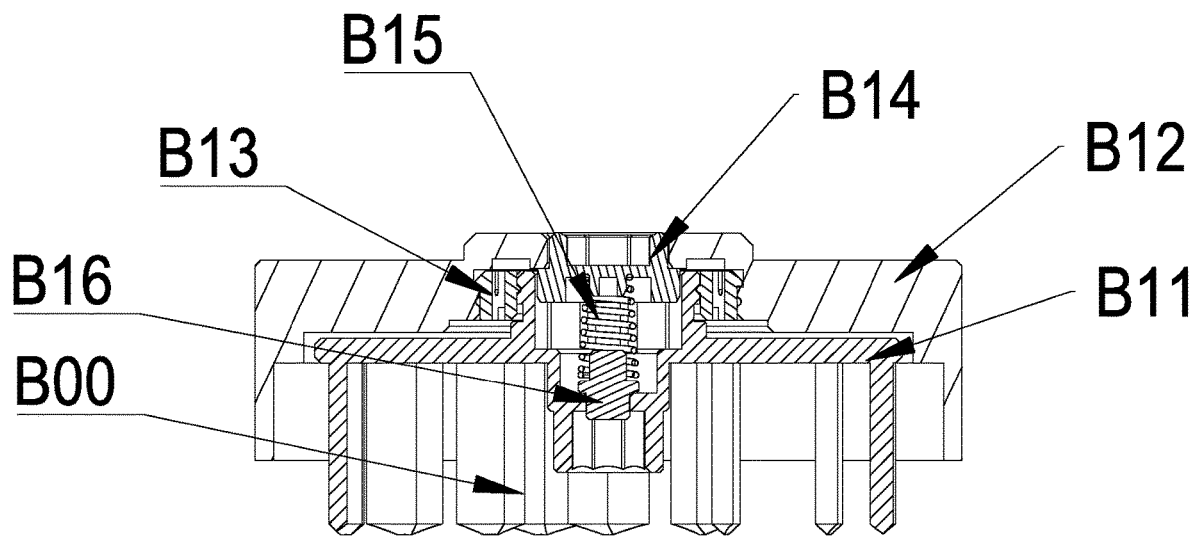
FIG. 15 is a cross-sectional view illustrating an upper grinding.
Figure 16:
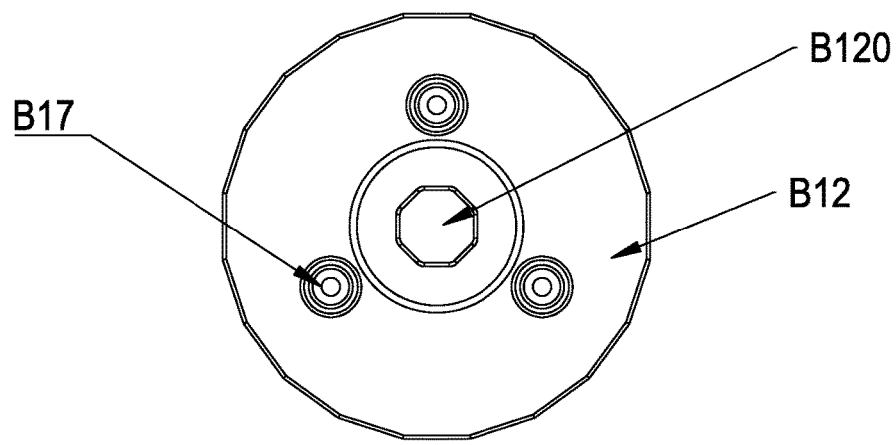
FIG. 16 is a top view illustrating a cutter lid.
Figure 17:
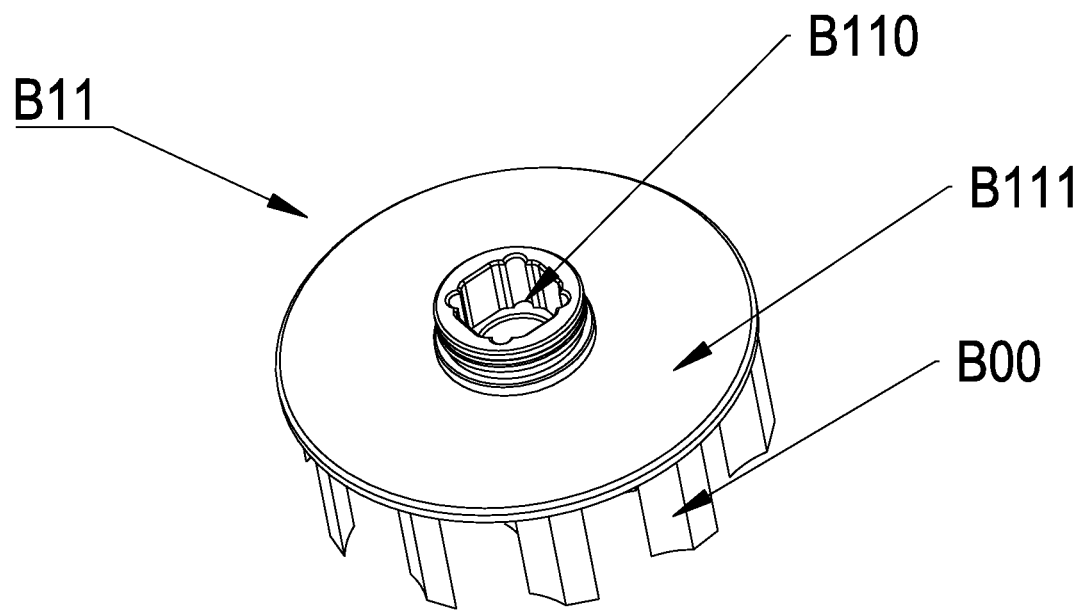
FIG. 17 is a perspective view illustrating an upper blade group.
Figure 18:
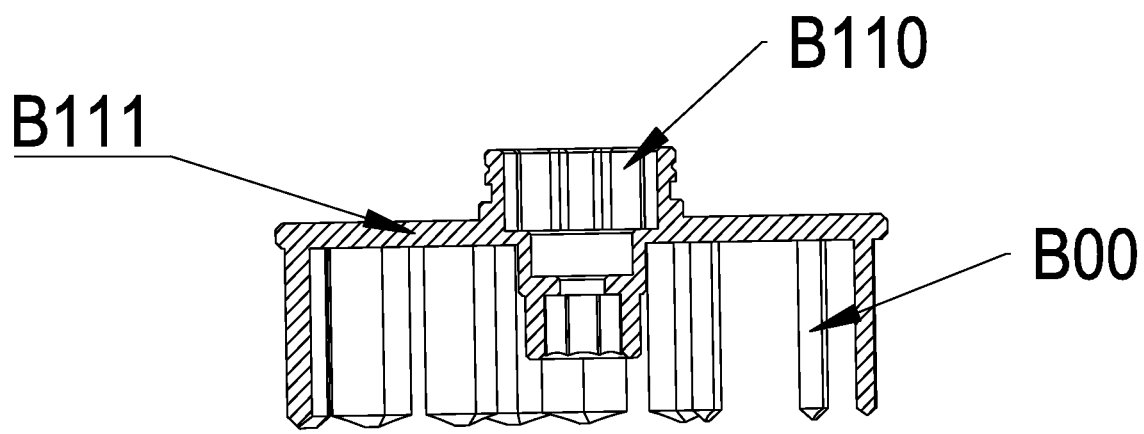
FIG. 18 is a cross-sectional view illustrating an upper blade group.
Figure 19:
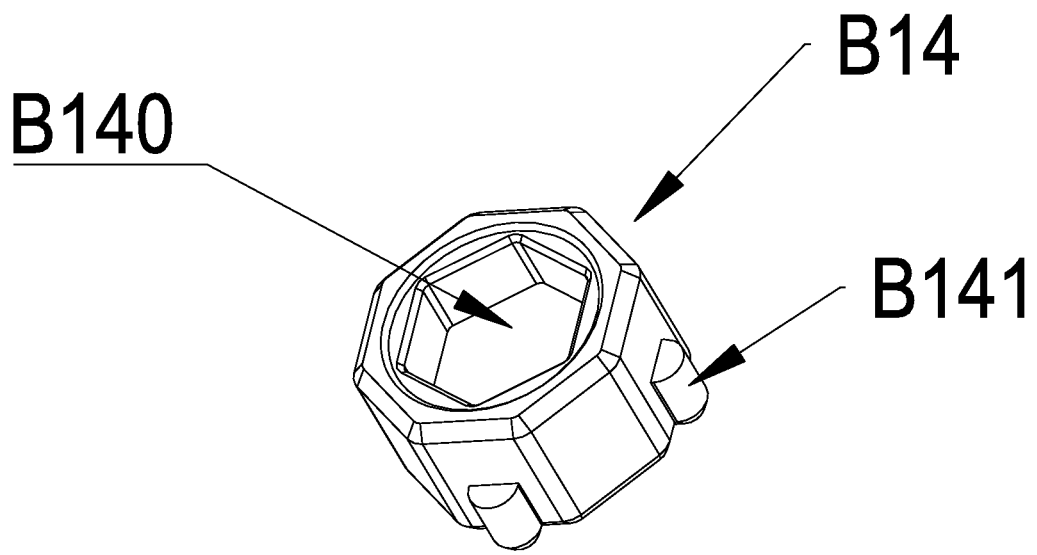
FIG. 19 is a perspective view illustrating a positioning bolt.

Referring to FIGS. 12 and 13, the stirring needle set comprises a stirring needle A161 and an extension rod A162. The stirring needle A161 includes a needle tip A1610, a needle bar A1611 and a needle head A1612. The upper side and lower side of the needle head A1612 are both provided with a thread, and the extension rod A162 comprises a hollow tube A1620 having an internal thread at one end The needle tip and the needle bar of the stirring needle A161 can be received in the hollow tube A1620 through a threaded connection between the thread provided on the inner side of the needle head and the internal thread of the extension rod, or can be connected to the extension rod A162 through a threaded connection between the thread provided on the outer side of the needle head A1612 and the internal thread of the extension rod. The end section of the outer side of the needle head is embedded with a third magnetic material A163 which is magnetically attracted to the third magnetic material A163 provided at the bottom of the cone-shaped groove.

Referring to FIGS. 14-19, the upper grinding section B1 further comprises a cutter lid B12 provided at an upper section of the upper blade group B11. The upper blade group B11 comprises a circular blade tray B111 and a plurality of blades B00 extending from and vertically disposed on the lower plane of the circular blade tray. The upper section of the upper blade group B11 is provided with a shaft connector B13 coupled to the lower section of the cutter lid B12. The shaft connector B13 has a function of preventing movement along the axis of the upper blade group B11 and the cutter lid B12 while allowing free rotation about the axial. The cutter lid B12 and the upper blade group B11 are respectively provided with a first axial hole B120 and a second axial hole B110 at the center. A positioning bolt B14 and a spring B15 are disposed between the first axial hole B120 and the second axial hole B110. The outer wall of the upper section of the positioning bolt B14 is engaged with the inner wall of the first axial hole B120. The upper section of the positioning bolt B14 is provided with an axial groove B140 fitting with the outer shape of the drive shaft A0 and the outer wall of the lower section of the positioning bolt is engaged with the inner wall of the second axial hole. When pushed up by the spring B15, the positioning bolt B14 positions the first axial hole B120 and the second axial hole B110 simultaneously in a radial direction. When connected to the drive shaft A0, the positioning bolt B14 is displaced downwardly and stops positioning the first axial hole B120.

Figure 20:
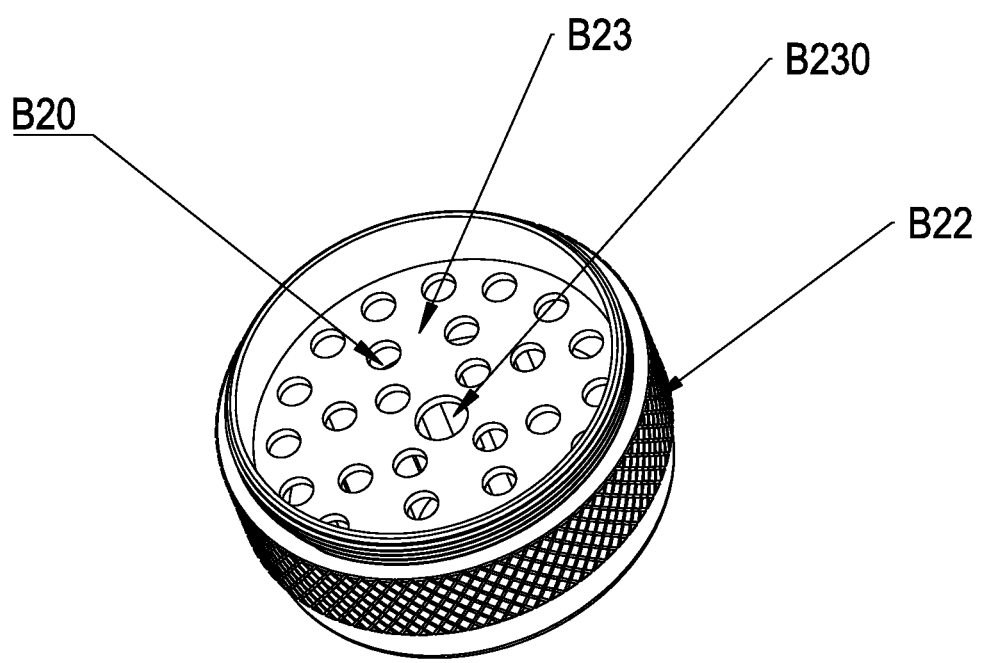
FIG. 20 is a perspective view illustrating a lower grinding section.
Figure 21:
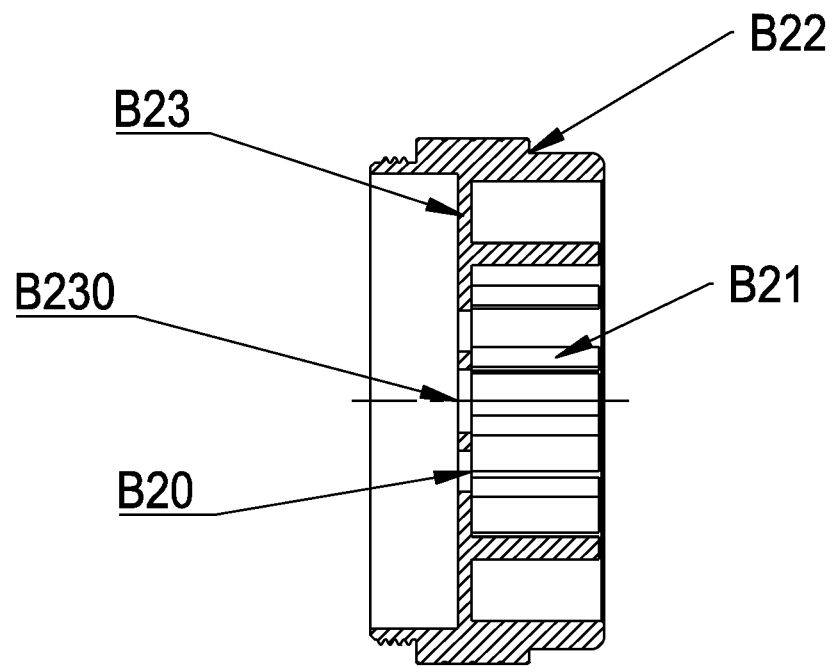
FIG. 21 is a cross-sectional view illustrating a lower grinding.

Referring to FIGS. 20-21, the lower grinding section B2 includes a tubular body B22. A central partition B23 is arranged within the tubular body B22. The lower blade group B21 and mesh holes B20 are disposed on the central partition B23. The central partition B23 is further provided with a third axial hole B230.

Figure 22:
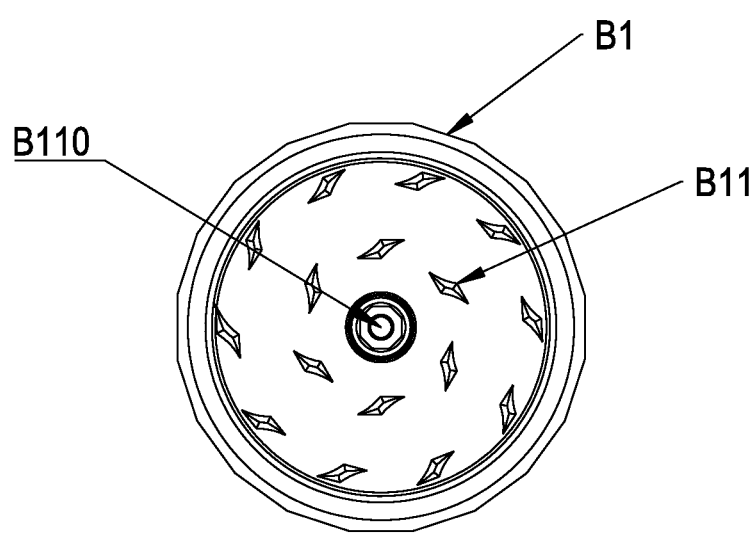
FIG. 22 is a bottom view illustrating a lower grinding section.

Referring to FIG. 22, the upper blade group B11 and the lower blade group B21 are respectively provided with 2 rings of blades which in some embodiments have a diamond-shaped cross-section.

Figure 23:
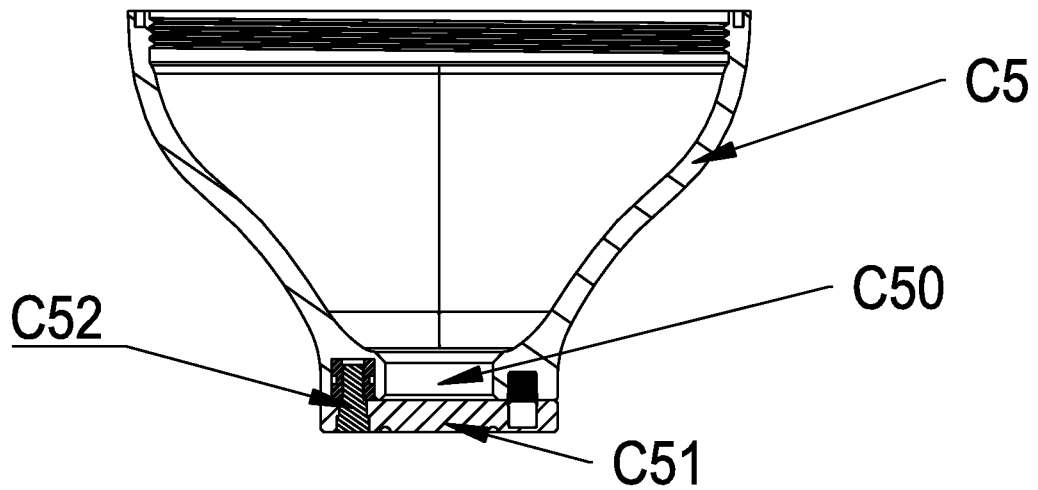
FIG. 23 is a cross-sectional view of the funnel bin.
Figure 24:
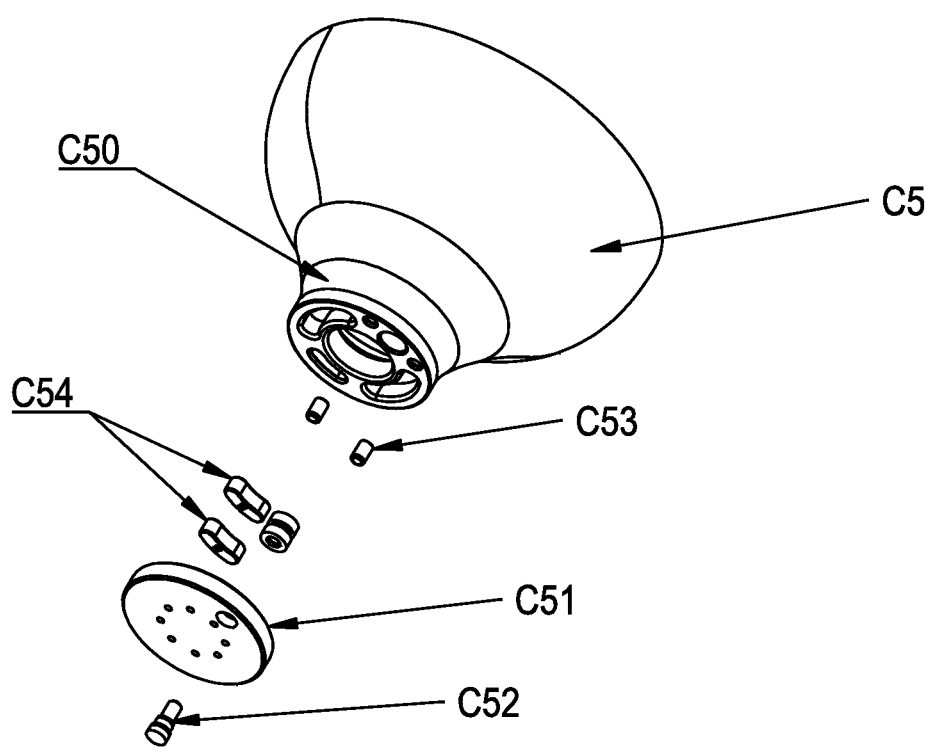
FIG. 24 is an exploded view of the funnel bin.

Referring to FIGS. 9 and 23-24, the discharge section C comprises a funnel bin C5 and fan blades C6 disposed in the funnel bin. The outer wall of the funnel bin C5 is removably attached to the outer wall of the lower grinding section B2, and a fan shaft extending upwardly is formed at the center of the fan blades C6. The fan shaft is received in the rotating shaft of the upper grinding section B1. A second magnetic material is embedded on the top end of the fan shaft to provide a removable connection. The drive shaft A0 sequentially connects the rotating shaft of the upper grinding section B1 and the fan shaft, driving the upper grinding section B1 and causing the fan blades C6 to rotate. With the rotation of the fan blade C6, the ground materials, which are falling through the holes B20, are loosened and transported to the bottom, and then actively discharged out when the funnel cap C51 is opened. This permits the user to discharge the ground material without having to disassemble the grinder. In some embodiments, the driving section provides a 1:1 gear ratio with respect to the grinding section and a 1:4 gear ration with respect to the fan blades.

In some embodiments, the bottom of the funnel bin C5 is provided with a funnel opening C50 with the funnel cap C51 covering the funnel opening C50. A pin C52 configured to connect the end section of the funnel opening and the funnel cap C51 is arranged therebetween, and the funnel cap C51 rotates and swivels about the pin to open and close the funnel opening C50 of the funnel bin C5.

In some embodiments the end section of the funnel opening C50 includes a cylindrical spring C53 at the pin C52. A positioning groove for receiving the cylindrical spring bead is provided on the funnel cap C51 at a position corresponding to the cylindrical spring C53. When the funnel cap C51 is closed or opened, the cylindrical spring C53 is engaged with the positioning groove for positioning in order to maintain the closed or open status.

Further still, in some embodiments the end section of the funnel opening C50 and the funnel cap C51 are respectively embedded with an attracting magnetic material C54 at corresponding opposing positions. The magnetic attraction allows the funnal cap C51 to be retained against the funnel opening C50 until sufficient manual force is applied to break same. This prevents inadvertent opening of the funnel cap.

The materials selected for the grinder of the present invention are not particularly limiting however in some embodiments at least a section of the discharge section C is comprised of a transparent material so that the user can easily observe the contents therein.

It is appreciated and understand that the grinder is compact, easy to carry, and easy to use. The gear-driven driving component has an accelerating transmission mechanism, and the discharge part has an active discharging mechanism, namely the fan. In some embodiments, most if not all components are magnetically but removably attached to one another by corresponding opposing attracting magnetic materials, which is convenient for the user to assemble and disassemble and access desired quantities of ground material.

It is to be noticed that the term "comprising," used in the claims, should not be interpreted as being limitative to the means listed thereafter. Thus, the scope of the expression "a device comprising means A and B" should not be limited to devices consisting only of components A and B. It means that with respect to the present invention, the only relevant components of the device are A and B. Put differently, the terms "including", "comprising" and variations thereof mean "including but not limited to", unless expressly specified otherwise.

Similarly, it is to be noticed that the term "coupled", also used in the claims, should not be interpreted as being limitative to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

The enumerated listing of items does not imply that any or all of the items are mutually exclusive, unless expressly specified otherwise. The terms "a", "an" and "the" mean "one or more", unless expressly specified otherwise.

Elements of the invention that are in communication with each other need not be in continuous communication with each other, unless expressly specified otherwise. In addition, elements of the invention that are in communication with each other may communicate directly or indirectly through one or more other elements or other intermediaries.

One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that any alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

The invention claimed is:

1. A portable manual grinder, comprising:
a driving section, a grinding section and a discharging section each coaxially connected to one another;
the driving section includes a drive shaft driving a central axis of the grinding section;
the grinding section includes an upper grinding section and a lower grinding section that are coaxially disposed and mated together;
the upper grinding section includes an upper blade group and the lower grinding section includes a lower blade group, and the upper blade group and the lower blade group are respectively composed of a plurality of upright blades arranged in a circular shape;
the bottom section of the lower grinding section one or more holes communicating with the discharge section;
the driving section and the upper grinding section are magnetically attracted and connected to each other by a first magnetic material provided on each of them at corresponding positions;
the upper grinding section and the discharge section are respectively coaxially provided with a second magnetic material such that the upper grinding section and the lower grinding section are magnetically attracted and connected to each other;
wherein the driving section further comprises an outer cover and a bottom cap connected to the bottom of the outer cover, wherein the drive shaft is disposed at a center of the interior of the outer cover and protrudes from the bottom cap; wherein rotating the driving section rotates the drive shaft; and
wherein a cone-shaped groove is disposed downwardly from a center of an upper end of the outer cover; and a stirring needle set is installed within the cone-shaped groove.

2. The portable manual grinder of claim 1, wherein the outer cover includes an annular inner wall, an inner gear is disposed on the annular inner wall; a driven gear is coaxially disposed on the drive shaft, and an intermediate gear, which is to be simultaneously engaged with the inner gear and the driven gear, is provided therebetween.

3. The portable manual grinder of claim 2, wherein an upper plane of the upper grinding section is in contact with a lower plane of the bottom cap and a downward hollow protruding step is formed on the lower plane of the bottom cover; and the upper grinding section is provided with a groove at a position corresponding to the hollow protruding step such that the groove is configured to hold the hollow protruding step and wherein the first magnetic material is respectively embedded in the hollow protruding step and at the bottom of the groove.

4. The portable manual grinder of claim 2, wherein a gear bracket is arranged within the outer cover, and the driven gear and the intermediate gear both disposed on the gear bracket.

5. The portable manual grinder of claim 1, wherein the stirring needle set comprises a stirring needle and an extension rod, wherein the stirring needle includes a needle tip, a needle bar and a needle head, the needle head is provided with threads on its upper and lower sides, and the extension rod comprises a hollow tube having an internal thread at one end; wherein the needle tip and the needle bar of the stirring needle can be received in the hollow tube through a threaded connection between the thread provided on the inner side of the needle head and the internal thread of the extension rod, or can be connected to the extension rod through a threaded connection between the thread provided on the outer side of the needle head and the internal thread of the extension rod; and wherein the end section of the outer side of the needle head is embedded with a third magnetic material which is magnetically attracted to the third magnetic material provided at the bottom of the cone-shaped groove.

6. The portable manual grinder of claim 1, wherein the lower grinding section includes a tubular body and an axial hole at the center.

7. The portable manual grinder of claim 1, wherein the upper blade group and the lower blade group are respectively provided with two rings of blades, which are arranged in circular shape, and the two rings of blades of the upper blade group are respectively close to those of the lower blade group, and each blade has a diamond shape.

8. The portable manual grinder of claim 1, wherein an outer wall of the discharge section is connected to an outer wall of the lower grinding section, a column is formed upwardly at a center of the interior of discharge section; wherein the column passes through an axial hole formed on the lower grinding section and a second magnetic material is embedded on a top end of the column.

9. A portable manual grinder, comprising:
a driving section, a grinding section and a discharging section each coaxially connected to one another;
the driving section includes a drive shaft driving a central axis of the grinding section;
the grinding section includes an upper grinding section and a lower grinding section that are coaxially disposed and mated together;
the upper grinding section includes an upper blade group and the lower grinding section includes a lower blade group, and the upper blade group and the lower blade group are respectively composed of a plurality of upright blades arranged in a circular shape;
the bottom section of the lower grinding section one or more holes communicating with the discharge section;
the driving section and the upper grinding section are magnetically attracted and connected to each other by a first magnetic material provided on each of them at corresponding positions;
the upper grinding section and the discharge section are respectively coaxially provided with a second magnetic material such that the upper grinding section and the lower grinding section are magnetically attracted and connected to each other;
wherein the discharging section comprises a funnel bin with fan blades disposed in the funnel bin; an outer wall of the funnel bin is connected to an outer wall of the lower grinding section; a fan shaft is formed at the center of the fan blades and extending upwardly; the fan shaft is received in the rotating shaft of the upper grinding section; the second magnetic material is embedded on the top end of the fan shaft; and the drive shaft sequentially connects the rotating shaft of the upper grinding section and the fan shaft, driving the upper grinding section and the fan blades to rotate.

10. The portable manual grinder of claim 9, wherein the bottom of the funnel bin includes a funnel opening and a funnel cap covering the funnel opening; wherein a pin is configured to connect the end section of the funnel opening and the funnel cap is arranged therebetween such that the funnel cap rotates about the pin to provide access to the funnel bin.

11. The portable manual grinder of claim 10, wherein the end section of the funnel opening is embedded with a spring located about the pin, and a positioning groove is configured to receive the spring at the funnel cap to position the cap with respect to the funnel opening.

12. The portable manual grinder of claim 10, wherein the end section of the funnel opening end and the funnel cap are respectively embedded with an attracting magnetic material at corresponding positions.

13. The portable manual grinder of claim 10, wherein the outer wall of the discharge section is at least partially made of a transparent material.

14. A portable manual grinder, comprising:
a driving section, a grinding section and a discharging section each coaxially connected to one another;
the driving section includes a drive shaft driving a central axis of the grinding section;
the grinding section includes an upper grinding section and a lower grinding section that are coaxially disposed and mated together;
the upper grinding section includes an upper blade group and the lower grinding section includes a lower blade group, and the upper blade group and the lower blade group are respectively composed of a plurality of upright blades arranged in a circular shape;
the bottom section of the lower grinding section one or more holes communicating with the discharge section;
the driving section and the upper grinding section are magnetically attracted and connected to each other by a first magnetic material provided on each of them at corresponding positions;
the upper grinding section and the discharge section are respectively coaxially provided with a second magnetic material such that the upper grinding section and the lower grinding section are magnetically attracted and connected to each other;
wherein the upper grinding section further comprises a cutter lid provided at an upper section of the upper blade group, the upper blade group includes is disposed on a lower plane of the circular blade tray, the upper section of the upper blade group is provided with a shaft connector coupled to the lower section of the cutter lid, the shaft connector preventing movement along an axis between the upper blade group and the cutter lid, but it allows for a free rotation in about the axis, the cutter lid and a center of the upper blade group are respectively provided with a first axial hole and a second axial hole, and a positioning bolt and a spring are disposed between the first axial hole and the second axial hole, and the outer wall of the upper section of the positioning bolt mates with the inner wall of the first axial hole, the upper section of the positioning bolt is provided with an axial groove fitting with the outer shape of the drive shaft, and the outer wall of the lower section of the positioning bolt mates with the inner wall of the second axial hole.

* * * * *